(12) United States Patent
Okamoto et al.

(10) Patent No.: US 11,388,297 B2
(45) Date of Patent: Jul. 12, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Takuya Okamoto, Kanagawa (JP); Yoshihito Suezawa, Kanagawa (JP); Shinsuke Nakazawa, Kanagawa (JP); Toshiyuki Komoda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 306 days.

(21) Appl. No.: 16/160,206

(22) Filed: Oct. 15, 2018

(65) Prior Publication Data
US 2019/0124217 A1   Apr. 25, 2019

(30) Foreign Application Priority Data

Oct. 23, 2017 (JP) .............................. JP2017-204471

(51) Int. Cl.
*H04N 1/00* (2006.01)
*H04N 1/21* (2006.01)

(52) U.S. Cl.
CPC ..... *H04N 1/00442* (2013.01); *H04N 1/00482* (2013.01); *H04N 1/00132* (2013.01); *H04N 1/2166* (2013.01)

(58) Field of Classification Search
CPC .. H04N 1/00; H04N 1/00442; H04N 1/00482; H04N 1/00132; H04N 1/2166
USPC ........................................................ 358/1.18
See application file for complete search history.

(56) References Cited

U.S. PATENT DOCUMENTS

| | | | | |
|---|---|---|---|---|
| 5,649,188 A | * | 7/1997 | Nomura | G06F 16/40 |
| 6,950,198 B1 | * | 9/2005 | Berarducci | G06Q 30/0601 |
| | | | | 705/26.1 |
| 6,999,198 B1 | * | 2/2006 | Nakagiri | B42C 19/00 |
| | | | | 358/1.13 |
| 2005/0044489 A1 | * | 2/2005 | Yamagami | G11B 27/034 |
| | | | | 715/243 |
| 2010/0131566 A1 | * | 5/2010 | Sato | G06F 40/10 |
| | | | | 707/802 |
| 2010/0246925 A1 | * | 9/2010 | Nagatsuka | A61B 5/08 |
| | | | | 382/132 |
| 2012/0020643 A1 | * | 1/2012 | Kato | H04N 21/4325 |
| | | | | 386/241 |

(Continued)

FOREIGN PATENT DOCUMENTS

| | | |
|---|---|---|
| JP | H11-025103 A | 1/1999 |
| JP | 2001-045339 A | 2/2001 |

(Continued)

OTHER PUBLICATIONS

Jun. 22, 2021 Office Action issued in Japanese Patent Application No. 2017-204471.

*Primary Examiner* — Darryl V Dottin
(74) *Attorney, Agent, or Firm* — Oliff PLC (57) ABSTRACT

An information processing apparatus includes a display controller. When a reduced image of a document and an accompanying image placed in the area surrounding the reduced image are presented, the display controller performs display control in such a manner that a selection image indicating that the reduced image is selected is presented in a different form in accordance with the accompanying image.

9 Claims, 5 Drawing Sheets

(56) References Cited

U.S. PATENT DOCUMENTS

2017/0293826 A1* 10/2017 Kemmochi ............... B43L 1/04

FOREIGN PATENT DOCUMENTS

| JP | 2004-086426 A | 3/2004 |
| JP | 2004-282225 A | 10/2004 |
| JP | 2013-512508 A | 4/2013 |

* cited by examiner

DOCUMENT 2

FIG. 7B

DOCUMENT 2

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-204471 filed Oct. 23, 2017.

BACKGROUND

(i) Technical Field

The present invention relates to an information processing apparatus and a non-transitory computer readable medium.

(ii) Related Art

There are various document management software applications known in the related art, which are capable of presenting a reduced image of a document, that is, a thumbnail, so that contents of the document are recognizable by such a reduced image. When any of thumbnails of documents that are presented is clicked by a user, such a document management software application informs the user that the clicked document is selected properly by presenting a selection frame enclosing the thumbnail of the document.

Some of such document management software applications have a function of presenting an image that represents the thickness of the document and adding the image to the thumbnail when presenting the thumbnail so that the relative volume of the number of pages included in the document is recognized.

SUMMARY

According to an aspect of the invention, there is provided an information processing apparatus including a display controller. When a reduced image of a document and an accompanying image placed in the area surrounding the reduced image are presented, the display controller performs display control in such a manner that a selection image indicating that the reduced image is selected is presented in a different form in accordance with the accompanying image.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the invention will be described with reference to the drawings.

Figure 1:
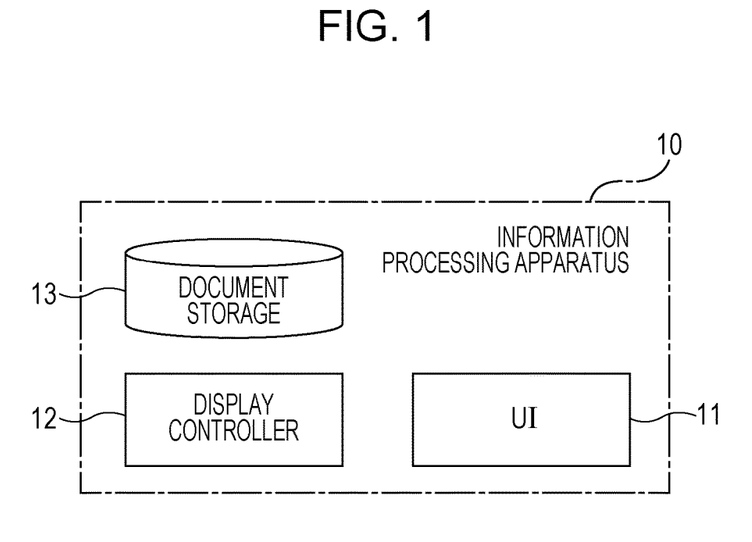
FIG. 1 is a block diagram depicting an information processing apparatus according to an exemplary embodiment of the invention.
Figure 2:
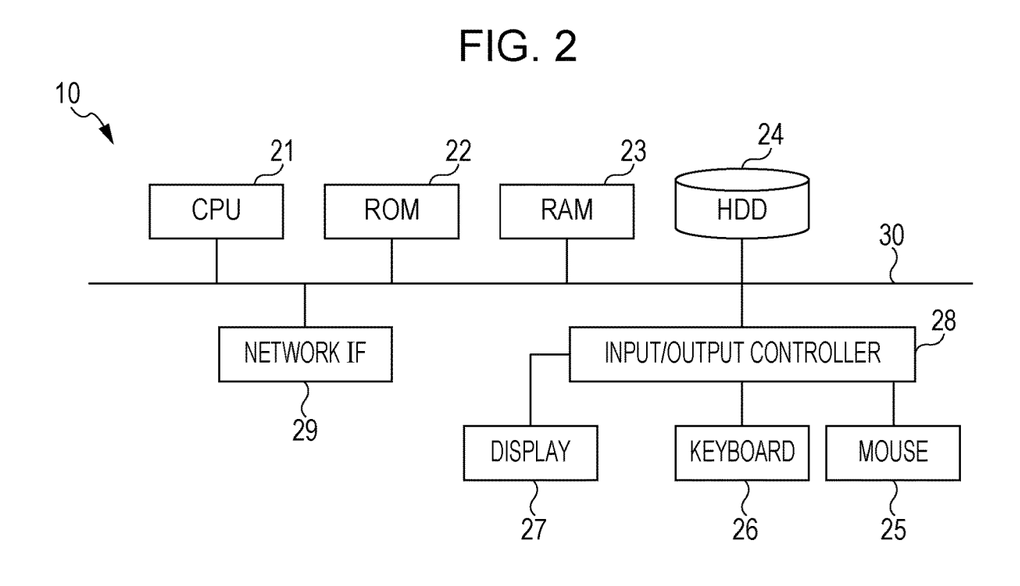
FIG. 2 illustrates a hardware configuration of a computer that constitutes the information processing apparatus according to this exemplary embodiment.

FIG. 1 is a block diagram depicting an information processing apparatus 10 according to the exemplary embodiment of the invention. FIG. 2 illustrates a hardware configuration of a computer that constitutes the information processing apparatus 10 according to this exemplary embodiment.

The information processing apparatus 10 according to this exemplary embodiment may be realized by using a computer having general-purpose hardware, such as a personal computer (PC). As depicted in FIG. 2, the information processing apparatus 10 is configured such that a central processing unit (CPU) 21, a read-only memory (ROM) 22, a random-access memory (RAM) 23, a hard disk drive (HDD) 24, an input/output controller 28, and a network interface (IF) 29 are connected to an internal bus 30. A mouse 25 and a keyboard 26, equipped as an input unit, and a display 27, equipped as a display unit, are each connected to the input/output controller 28. The network IF 29 is equipped as a communication unit. In an information processing apparatus using a liquid crystal display as a user interface, such as a tablet terminal, the liquid crystal display serves as an input unit and a display unit.

The information processing apparatus 10 according to this exemplary embodiment includes a user interface (UI) 11, a display controller 12, and a document storage 13 as depicted in FIG. 1. In FIG. 1, elements that are not used for description of this exemplary embodiment are omitted.

The user interface 11 is a user interface unit that receives information that is input by using the mouse 25 or the keyboard 26 and outputs information to the display 27 by using various screen images. This exemplary embodiment provides a first display form and a second display form as display forms of document thumbnails. The first display form is realized in a thickness display mode, and the second display form is realized in a thickness non-display mode. The user interface 11 serves as a selector that enables a user to select which display mode is used in presenting the document thumbnails. The display controller 12 realizes a function of a document management software application and performs display control to cause the user interface 11 to display thumbnails of documents stored in the document storage 13 and thumbnails of documents received via a network.

The document storage 13 stores document files to be displayed and document information such as attributes of the document files to be displayed. In this exemplary embodiment, the term, "document file", refers to not only a file that is constituted only by character sequences, which is a document file in a narrow sense, but also a file generated in such a way that an amount of contents in a document is countable in a unit such as pages. It is to be understood that the term, "document file", is used in a broad sense and may include not only character sequences, but also images such as drawings and photographs.

Each of the elements 11 and 12 in the information processing apparatus 10 is realized by cooperative operation between the computer that constitutes the information processing apparatus 10 and programs operating on the CPU 21 mounted in the computer. The document storage 13 is realized by using the HDD 24 mounted in the information processing apparatus 10. Alternatively, the document storage 13 may also be realized by using the RAM 23 or by using an external storage unit via a network.

The programs used in this exemplary embodiment may be provided by transmission via the communication unit or in a stored form in a recording medium readable by a computer, such as a compact-disc read-only memory (CD-ROM) or a Universal Serial Bus (USB) memory. The programs provided by using the communication unit or the recording medium are installed into the computer, and the CPU 21 of the computer executes the programs consecutively to realize various processes.

Figure 3:
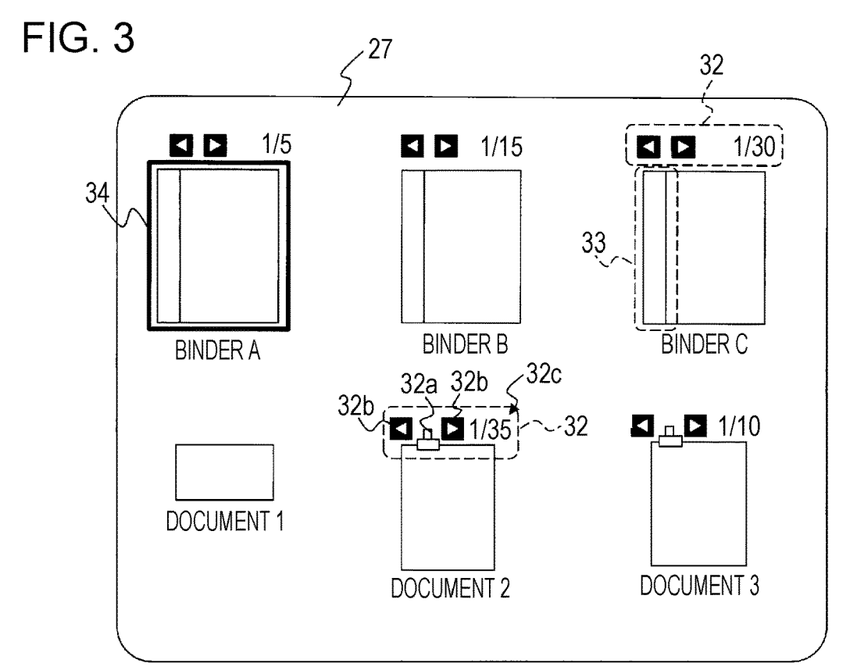
FIG. 3 illustrates an example presentation of documents, which are presented in a thickness non-display mode according to this exemplary embodiment.
Figure 4:
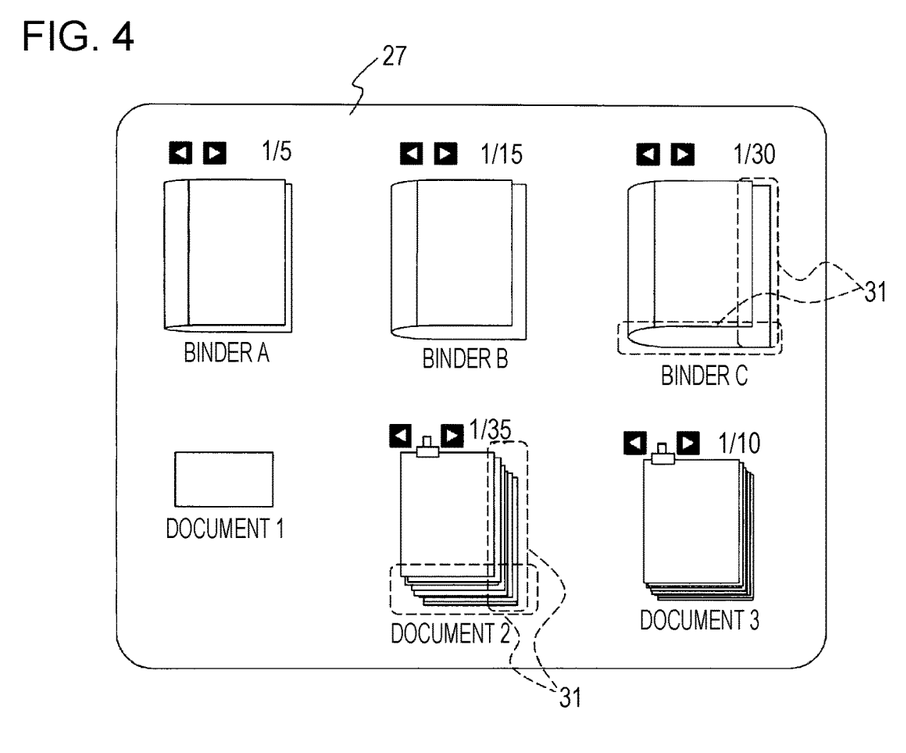
FIG. 4 illustrates an example presentation of the documents, which are presented in a thickness display mode according to this exemplary embodiment.

This exemplary embodiment provides the thickness display mode and the thickness non-display mode as modes in which the thumbnails are presented. In the thickness display mode, a reduced image of a document is presented with a thickness image of the document added to the reduced image, and in the thickness non-display mode, the reduced image is presented without the thickness image of the document added. FIG. 3 illustrates an example presentation of documents presented on the display 27, and thumbnails are presented in the thickness non-display mode in this example presentation. FIG. 4 illustrates an example presentation of the same documents as in FIG. 3, which are presented on the display 27, and the thumbnails are presented in the thickness display mode in this example presentation. A comparison between FIG. 3 and FIG. 4 reveals that when a thumbnail is presented in the thickness display mode, an image representing the thickness of a document is presented in accordance with the number of pages in the document.

A document thumbnail is produced from a reduced image of a document. To be precise, the document thumbnail includes the reduced image of the document and accompanying images of the document that are optionally generated and added to the reduced image. In this exemplary embodiment, accompanying images 31 and 32 are presented. As depicted in FIG. 4, the accompanying images 31 are images representing document thickness and placed in areas surrounding reduced images. A comparison among documents 1, 2, and 3 reveals that a thickness width, which is a width representing the document thickness, increases as the document becomes thicker, leading to easy visual recognition of an amount of contents in the document. The accompanying image 31 is not added to a document that only has one page. As depicted in FIG. 3, the accompanying images 32 are images of presentation components to enable selection of a page to be presented in a document having multiple pages and include a clip image 32a to bind the multiple pages, buttons 32b to change a reduced image to be presented to the subsequent page or to the preceding page, and page information 32c presenting the total number of pages of the document and the page number of a current display image. The accompanying image 32 is not added to a document that only has one page.

The accompanying image 31 representing thickness (hereinafter, referred to as a thickness image) represents the document thickness as described above. The document thickness, that is, the amount of contents in the document, is typically determined by the number of pages that constitute the document but not determined only by the number of pages. For example, when a sheet of A3 size is folded and bound into a document of A4 size, the number of pages does not increase, but the document thickness increases. In such a case, when a sheet of different size is folded and bound into a document, the thickness image 31 of the document may be presented by enlarging the thickness width of the thickness image 31. Other than presenting the amount of contents in the document described above, the thickness image 31 may represent information on, for example, the number of characters, the number of images, and the like. The thickness width of the thickness image 31 may be determined based on the overall consideration of such information.

Similarly to the thumbnails of the documents, the accompanying image 32 to change pages that are to be presented is also added to the binders. The accompanying image 32 does not include a clip image to bind a document, but a band 33 is added instead as an accompanying image to visually indicate that multiple documents are bound.

Although a reduced image of a document may be generally called a "thumbnail", in this exemplary embodiment, as described above, a display image produced by adding accompanying images to a reduced image of a document is called a "thumbnail". Because a document and a binder are not treated differently in this exemplary embodiment, contents corresponding to both of the document and the binder are referred to simply as a "document" in a description that applies to a document and a binder both unless otherwise specified.

FIG. 3 also illustrates a selection frame 34 that is presented when any of the thumbnails of the documents that are presented is clicked by a user. The selection frame 34 is presented so as to enclose the thumbnail selected by clicking. FIG. 3 reveals that a binder A is selected by a user.

Next, display control processing of the selection frame 34 performed by the display controller 12 in this exemplary embodiment will be described with reference to a flowchart illustrated in FIG. 5.

As described above, this exemplary embodiment provides the thickness display mode and the thickness non-display mode as the modes in which thumbnails are presented. When documents are presented on the display 27, the user interface 11 enables a user to select whichever of the thickness display mode and the thickness non-display mode is used to present the thumbnails of the documents by, for example, presenting a predetermined selection screen on the display 27. The mode selection performed by the user every time documents are presented may be omitted by setting in advance an initial setting of specifying which mode is used to present documents.

While the documents are being presented on the display 27, the display controller 12 waits for the user to select any of the documents by clicking (N in step S111). Then, when one of the documents is selected by clicking by the user (Y in step S111), the display controller 12 examines the current display mode and determines whether the current display mode is set to the thickness display mode or the thickness non-display mode. When the current display mode is set to the thickness non-display mode (N in step S112), that is, the thumbnails are presented without thickness images added as in the example presentation depicted in FIG. 3, the display controller 12 performs display control to enclose the thumbnail with the selection frame 34 of normal size in the same manner as before (step S117).

In contrast, when the current display mode is set to the thickness display mode (Y in step S112), that is, the thumbnails including the thickness images 31 are presented as in the example presentation depicted in FIG. 4, the display controller 12 obtains a thickness width of the thickness image 31 added to the selected document and calculates the size of the thumbnail including the reduced image and the thickness image 31 (step S113). Then, the display controller 12 produces the selection frame 34 whose size is such that the entire thumbnail of the calculated size is enclosed (step S114).

Here it is assumed that the size of the produced selection frame 34 meets criteria (Y in step S115). Then, the display controller 12 performs display control to enclose the thumbnail selected by clicking with the selection frame 34 (step S116).

The production of the selection frame 34, which is characteristics of this exemplary embodiment, will be described in more detail with reference to FIGS. 6A and 6B.

Figure 6A:
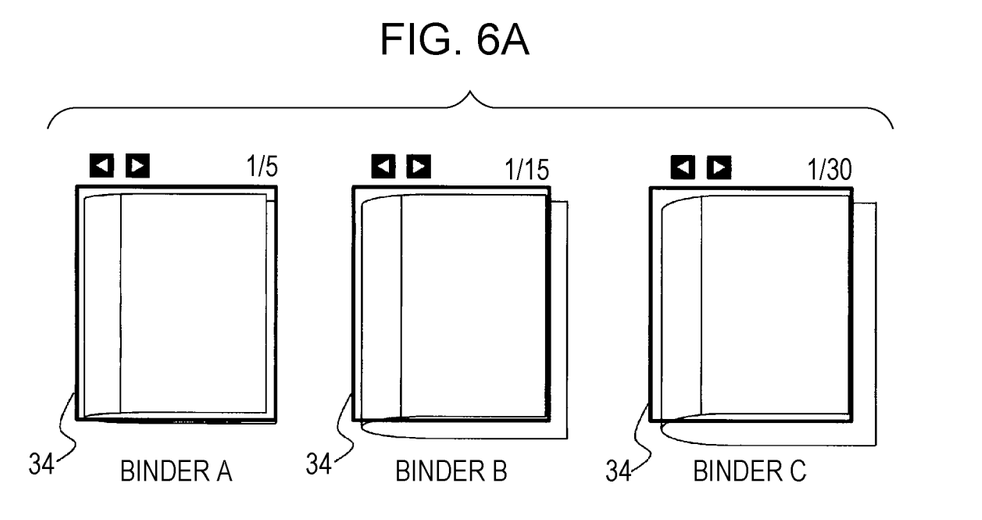
FIG. 6A illustrates an example presentation in which selection frames of normal size are presented when documents are presented in the thickness display mode according to this exemplary embodiment.
Figure 6B:
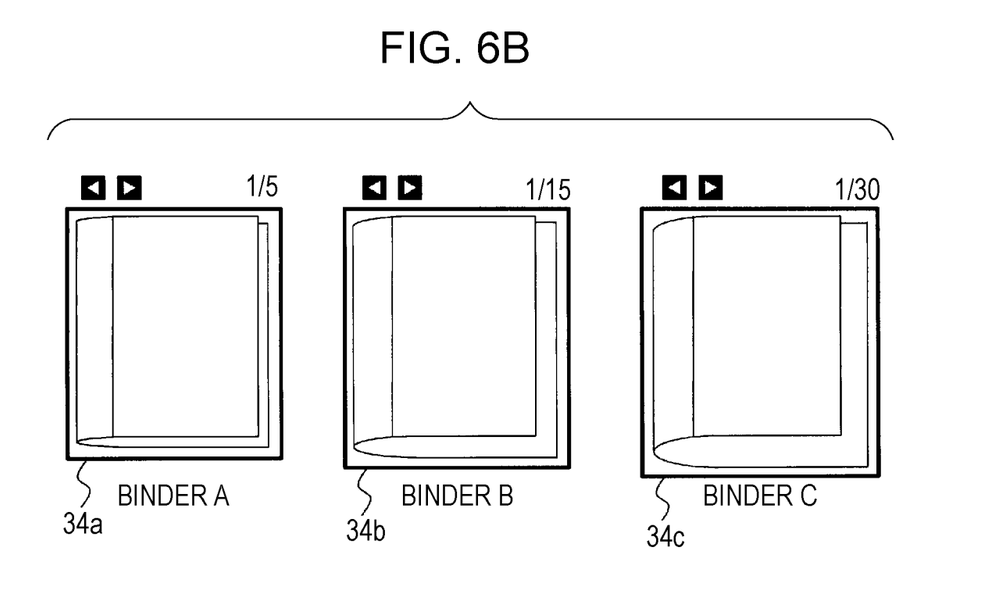
FIG. 6B illustrates an example presentation in which selection frames produced by applying display control of selection frames that is characteristic of this exemplary embodiment are presented when the documents are presented in the thickness display mode according to this exemplary embodiment.

FIGS. 6A and 6B illustrate example presentations in which the binders A, B, and C are presented in accordance with the thickness display mode. Here, it is assumed that, as illustrated in FIG. 6A, the binders A, B, and C, to which thickness images are added, are treated so as to be enclosed with the selection frames 34 of normal size in the same manner as before, that is, the selection frames 34 for enclosing the binders A, B, and C, to which thickness images are not added. Then, the selection frames 34 are presented superposed on the thickness images as illustrated in FIG. 6A. In other words, the selection frames 34 do not serve as a frame.

In contrast, according to this exemplary embodiment, when binders are presented in accordance with the thickness display mode, the size of a thumbnail that includes a reduced image of a document and a thickness image added to the reduced image is obtained by calculating a thickness width of a binder represented by the thickness image, and a selection frame whose size is such that this thumbnail is enclosed is produced. Thus, as illustrated in FIG. 6B, the binders A, B, and C are enclosed with selection frames 34a, 34b, and 34c, respectively, which are not superposed on the thumbnails including the thickness images. In this way, the display control is performed in such a manner that the binders A, B, and C of the same size may be enclosed with the selection frames of different sizes in this exemplary embodiment.

The display controller 12 according to this exemplary embodiment has a characteristic of performing display control in such a manner that the selection image indicating that the thumbnail is selected is presented in a different form in accordance with the thickness image 31. Thus, the selection images in different forms are presented in the thickness display mode and in the thickness non-display mode as described above. The selection frames 34 presented in the thickness non-display mode and the selection frames 34a to 34c presented in the thickness display mode correspond to selection images in different forms because the selection frames have different side lengths although the selection frames are all rectangular. Further, in the thickness display mode, the size of the selection frame is changed in accordance with the thickness width of the thickness image. For example, the size of the selection frame is changed in proportion to the thickness width of the thickness image. In this way, the selection frames 34a to 34c that enclose the selected thumbnails without being superposed on the thumbnails may be produced.

In this exemplary embodiment, the selection frames of similar rectangular shape are used as selection images indicating that the thumbnails are selected in the thickness display mode and in the thickness non-display mode. However, when similar forms are used, for example, as in this exemplary embodiment, the selection images of the similar rectangular shape are used, a user has difficulty in recognizing the difference in the display mode. Thus, selection images having completely different forms may be used in the thickness display mode and in the thickness non-display mode. For example, the selection frames may enclose the thumbnails in the same manner as before in the thickness non-display mode, and a hatch is added to the thumbnail in the thickness display mode. A hatch is a form of the selection image by way of example, and other forms may be used for presentation.

In this exemplary embodiment, the first display form of a display image (thumbnail) of a document is a form in which a thumbnail produced by placing an accompanying image in the area surrounding a reduced image of a document is presented, and the thickness image 31 is described as an example of the accompanying image added to the reduced image. This is only an example. An accompanying image placed in the area surrounding the reduced image of the document may be, for example, an image such as a sticker.

Figure 7A:
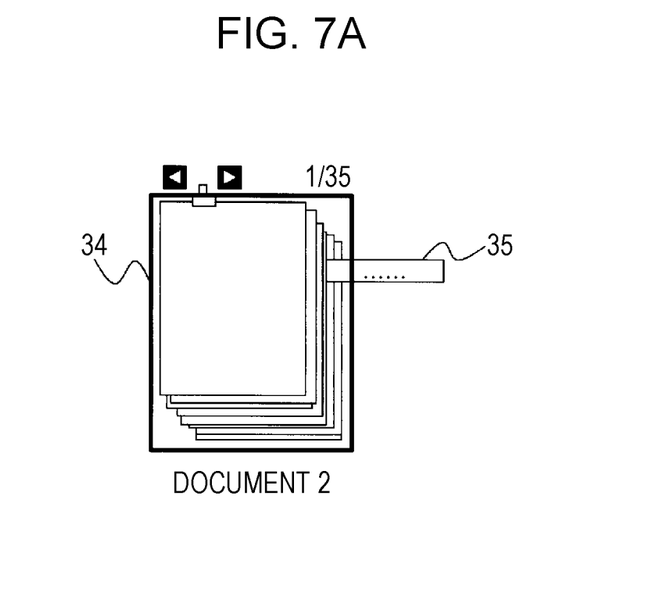
FIG. 7A illustrates an example presentation in which a selection frame of normal size is presented according to this exemplary embodiment when a thumbnail including a reduced image and a sticker added to the reduced image is presented.
Figure 7B:
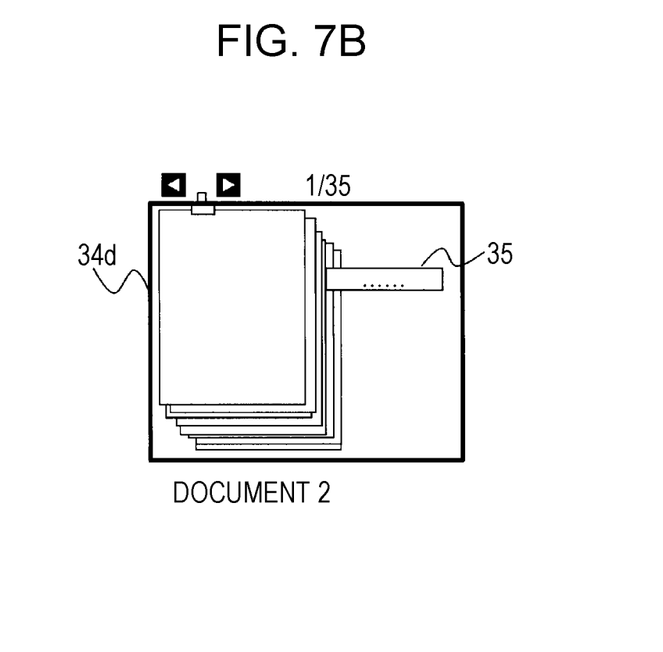
FIG. 7B illustrates an example presentation in which a selection frame produced by applying the display control of selection frames that is characteristic of this exemplary embodiment is presented as it is according to this exemplary embodiment when the thumbnail including the reduced image and the sticker added to the reduced image is presented.

FIGS. 7A and 7B illustrate example presentations in which a sticker 35 is added to the reduced image in addition to the thickness image. In FIG. 7B, the display control processing of selection frames that is characteristic of this exemplary embodiment is applied, and a selection frame 34d is produced so as to enclose the thumbnail including the sticker 35 as an accompanying image. This may be considered to be a deviation from a concept of enclosing the selected thumbnail with a selection frame.

Figure 5:
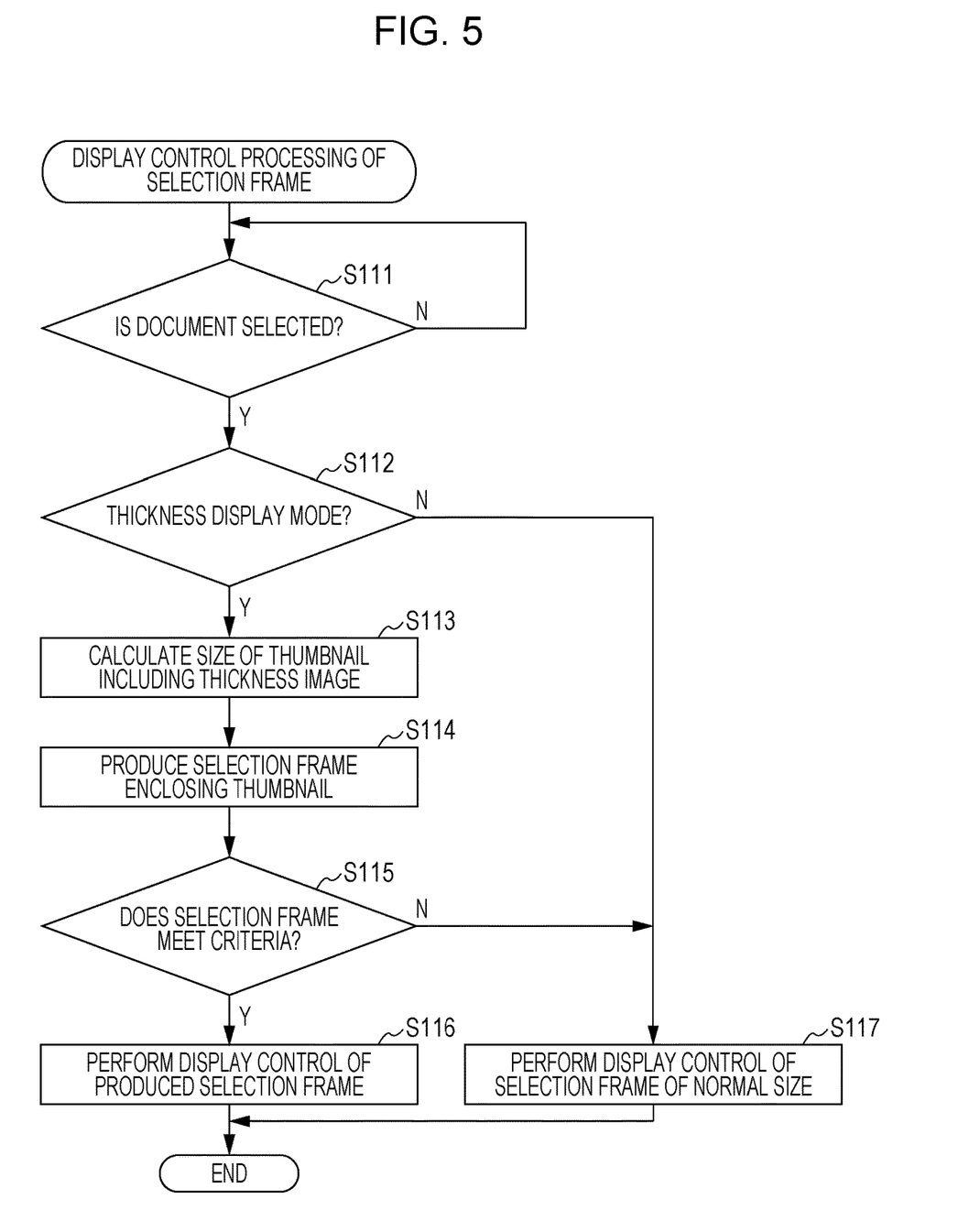
FIG. 5 is a flowchart illustrating display control processing of selection frames according to this exemplary embodiment.

Thus, in this exemplary embodiment, in the flowchart illustrated in FIG. 5, if the selection frame produced in step S114 does not meet criteria (N in step S115), the selection frame 34 of normal size is used instead of the produced selection frame (step S117). The criteria used here are thresholds specifying a predetermined region in which an accompanying image is presented extending from the area surrounding a reduced image. Specifically, in this exemplary embodiment, if the accompanying image is presented extending from the area surrounding the reduced image of the document to a position beyond the predetermined region, a selection frame enclosing at least the reduced image is presented. In this exemplary embodiment, the selection frame 34 of normal size is used in the same manner as before such that the selection frame is presented so as to enclose at least the reduced image. However, the use of the selection frame 34 of normal size is optional.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display controller that performs:
control to display a thumbnail of a document including a reduced image of the document and an accompanying image; and
control to display a selection image surrounding the thumbnail, wherein a size of the selection image changes in accordance with a size of the accompanying image, a size of the thumbnail being determined by calculating a thickness width of an item represented by the accompanying image, the selection image being sized to surround the thumbnail taking into consideration the determined size, the selection image being an image surrounding the thumbnail indicating that the thumbnail is selected.

2. The information processing apparatus according to claim 1, wherein
the selection image is a selection frame enclosing the reduced image and the accompanying image.

3. The information processing apparatus according to claim 1, further comprising:
a selector that enables selection between a first display form and a second display form as a display form of the reduced image, wherein
the display controller performs display control in such a manner that the selection image is presented in different forms when the first display form is selected and when the second display form is selected.

4. The information processing apparatus according to claim 3, wherein
the first display form is a form in which the reduced image with the accompanying image placed in the area surrounding the reduced image is presented, and the second display form is a form in which the reduced image without the accompanying image placed in the area surrounding the reduced image is presented.

5. The information processing apparatus according to claim 2, wherein
if the accompanying image is presented extending from the area surrounding the reduced image to a position beyond a predetermined region, the display controller presents the selection frame in such a manner that the selection frame encloses at least the reduced image.

6. A non-transitory computer readable medium storing a program causing a computer to execute a process for information processing, the process comprising:
performing display control to display a thumbnail of a document including a reduced image of the document and an accompanying image; and
performing display control to display a selection image surrounding the thumbnail, a size of the thumbnail being determined by calculating a thickness width of an item represented by the accompanying image, the selection image being sized to surround the thumbnail taking into consideration the determined size, wherein a size of the selection image changes in accordance with a size of the accompanying image, the selection image being an image surrounding the thumbnail indicating that the thumbnail is selected.

7. An information processing apparatus comprising:
means for performing display control to display a thumbnail of a document including a reduced image of the document and an accompanying image; and
means for performing display control to display a selection image surrounding the thumbnail, wherein a size of the selection image changes in accordance with a size of the accompanying image, a size of the thumbnail being determined by calculating a thickness width of an item represented by the accompanying image, the selection image being sized to surround the thumbnail taking into consideration the determined size, the selection image being an image surrounding the thumbnail indicating that the thumbnail is selected.

8. The information processing apparatus according to claim 3, wherein:
the display controller calculates a size of the thumbnail, the size obtained by calculating a thickness width of a binder represented by the accompanying image, and
the controller is configured to display an entirety of the thumbnail within a selection frame sized to enclose the thumbnail based upon the calculated thickness width when the first display form is selected.

9. The information processing apparatus according to claim 1, wherein
the accompanying image is a representation of a thickness of a document represented by the thumbnail.

* * * * *